United States Patent [19]
Berry

[11] Patent Number: 6,079,139
[45] Date of Patent: Jun. 27, 2000

[54] APPARATUS FOR CONDITIONING GAME TO OCCUPATION OF A HUNTING BLIND

[76] Inventor: Steven Berry, 432 Salem Dr., Richardson, Tex. 75080

[21] Appl. No.: 09/231,845

[22] Filed: Jan. 14, 1999

[51] Int. Cl.⁷ .......................... A01M 31/00; A01M 31/06
[52] U.S. Cl. .................................. 43/1; 135/901; 135/87; 43/2
[58] Field of Search .................................. 43/1, 2; 40/538; 135/901, 87; 446/361, 359, 363, 365, 84; 273/407

[56] References Cited

U.S. PATENT DOCUMENTS

| | | |
|---|---|---|
| 1,253,360 | 1/1918 | Dominy . |
| 1,425,869 | 8/1922 | Larsen . |
| 2,648,161 | 8/1953 | Stewart . |
| 4,074,459 | 2/1978 | Lopez .......................................... 46/47 |
| 5,682,701 | 11/1997 | Gammon ....................................... 43/2 |

*Primary Examiner*—Jack W Lavinder
*Attorney, Agent, or Firm*—John F. Bryan

[57] ABSTRACT

A device for conditioning wildlife to the presence of a hunter in a hunter's blind. An elongated plug member of lightweight material in the shape of a human head is suspended in the hunting blind. The plug is supported by a vertical support member attached to the plug at the longitudinal axis to permit pivotal movement of the plug in the blind. Also, a device is used to limit the horizontal displacement of the plug.

21 Claims, 7 Drawing Sheets

FIG. 1
FIG. 2
FIG. 3
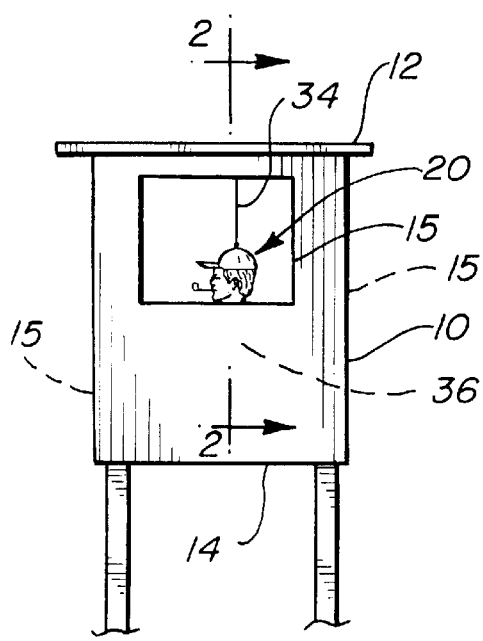
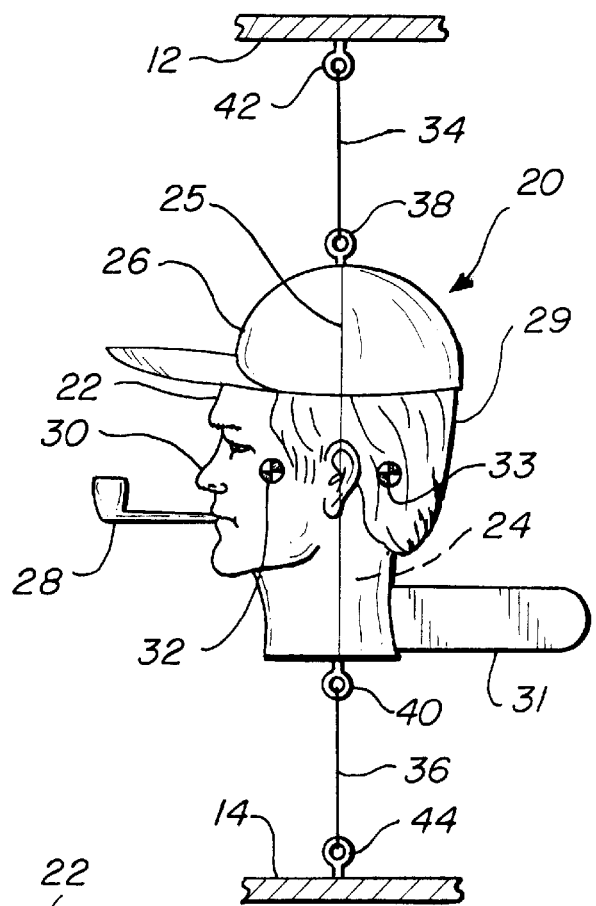
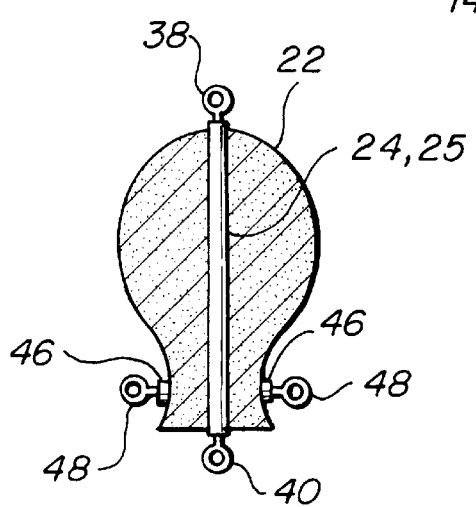

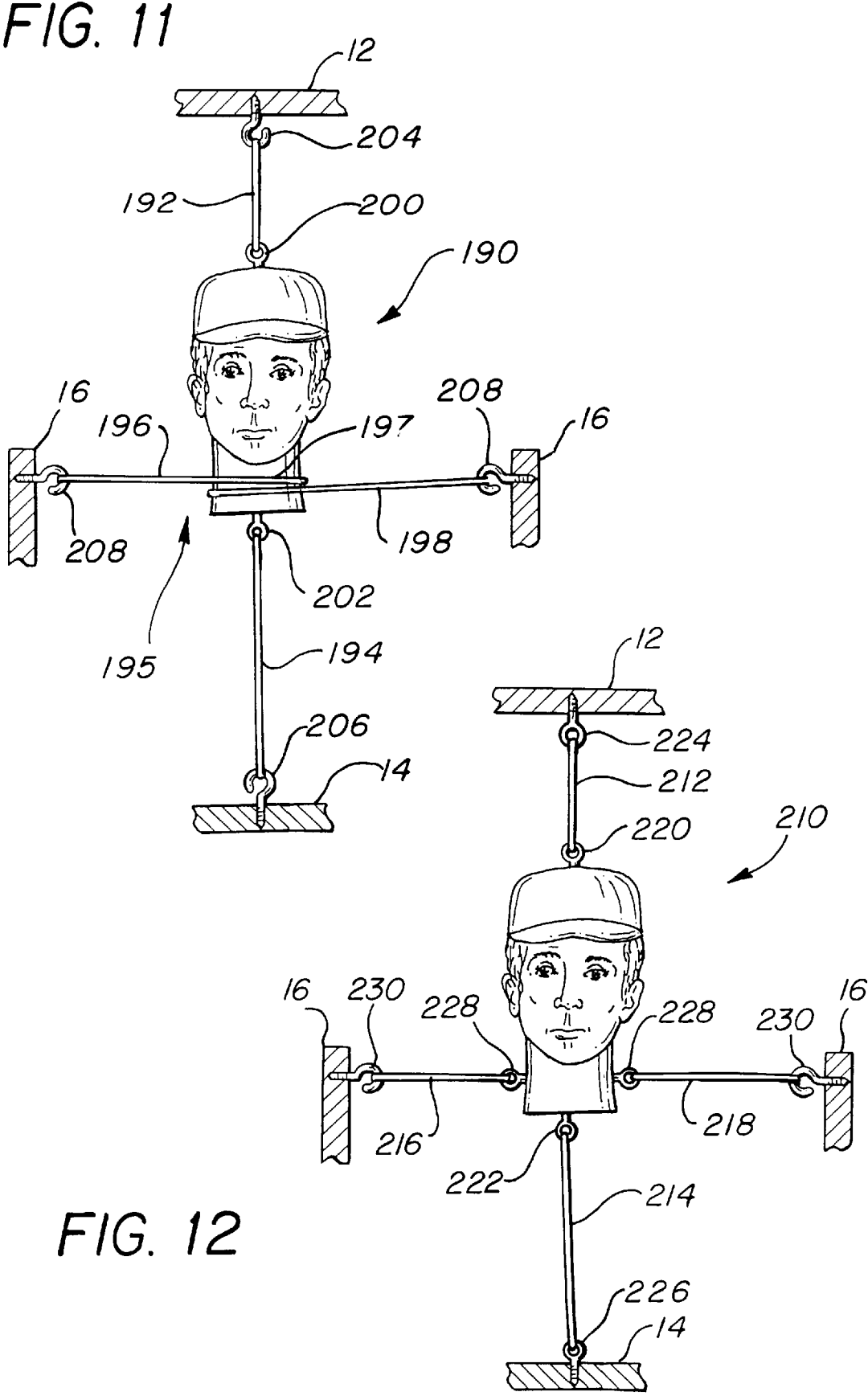

APPARATUS FOR CONDITIONING GAME TO OCCUPATION OF A HUNTING BLIND

TECHNICAL FIELD

The present invention relates generally to the field of game hunting and more particularly, to apparatus for conditioning game to human presence and movement in a hunting blind by providing year-round activity.

BACKGROUND OF THE INVENTIONS

Typically, hunting blinds such as elevated deer stands are placed in location in a hunting area and left there throughout the year. This is partly a matter of convenience but largely so that the game will become acclimated to the structure and accept it as part of the scenery. The practice is justified by the presumption that wild creatures are sensitive to any change in their habitat and will react skittishly to the unfamiliar. Human dummies, in hunter's attire, have been placed in hunting blinds during the off-season, in an effort to inure game to the appearance of hunters. More portable and less expensive inflatable "hunters" have also been marketed for this purpose, but the use of either hunter dummies or inflatable hunters is not widely regarded as an effective hunting stratagem.

On the other hand, it is common knowledge that an animal will often approach a motionless hunter without concern, as long as the scent is downwind, but will be startled by any slight movement. This logically indicates that introduction of a motionless blind into the habitat will, by itself, not elicit any particular reaction on the part of the game. Thus, from the perspective of a game animal, it is the movement associated with human occupancy that is identified as the problematic aspect of a hunting blind. It can also be inferred that any motionless device intended to inure game to the visible presence of a hunter is likely to be ineffective for that purpose. This being the case, the above mentioned stand-in hunters clearly do not provide the critical functionality of occasional movement that is needed to effectively inure game to human occupancy of a hunting blind.

Therefore, the first object of the present invention is to provide an improved method and apparatus for equipping a year 'round hunting blind so as to inure game to human occupancy by the production of occasional movement. A second object is to produce this occasional movement in conjunction with a visual indication of human presence, so as to associate the movement with innocuous human occupancy of the blind. Yet other objects are to implement this improved method with apparatus of a form that is inexpensively produced, readily packaged for distribution, and simple to install.

SUMMARY OF THE INVENTIONS

The present inventions contemplate improved methods and apparatus for equipping hunting blinds. Practice of the present inventions uses some steps and apparatus well known in the hunting blind and hunting stand construction arts and therefore, not the subject of detailed discussion herein.

In a preferred embodiment of the present inventions, an elongate plug member is provided, preferably in the shape of a mannequin head. The elongate plug member is preferably made from styrofoam or a similar lightweight material and may be cosmetically enhanced and topped with a cap, so as to simulate the general appearance of a hunter. This "hunter decoy" is mounted in the selected hunting blind in a partially exposed position. As discussed above, movement is key to the efficacy of the present inventions. It is considered critical that such movement should be apparent from any viewing angle. The movements of a life-like simulated hunter decoy should incorporate a pivotal, side-to-side scanning motion. Such motion is basically suitable for the desired purpose since it is characteristic of a real hunter and can be seen from any viewing angle,. Self centering torque is a necessary component of this pivotal action, otherwise the hunter dummy would only act as a wind direction indicator. While vigorous, random movements are not appropriate, subtle front to rear and lateral movements can be tolerated and could even add to the quality of the simulation. A preferred mounting arrangement might comprise vertically opposed strand members in tension, secured above and below the plug, and a single horizontal elastic tension member looped around the plug and secured to opposed attachment points on the blind. Thus mounted, the plug can pivot from right to left about the axis of the vertical strand members and is constrained to a limited range of horizontal movement. The looped elastic member provides a restoring force for self centering with a light damping action from hysterisis and friction. The preload and spring rate of the horizontal elastic members is selected to allow a plausibly lifelike range and rate of wind powered movement. The extent of horizontal displacement permitted to the plug is a function of the amount of tension in the vertical strand members. Such displacement can be virtually eliminated by increasing tension in the vertical support strand members. The vertical support strand members may be either elastic or inextensible, depending upon wind conditions at the installation site. If the blind is in a sheltered area, exposed only to gentle breezes, it makes little difference whether the vertical support strand members are extensible elastic or inextensible wire. However, if the blind is subjected to strong, gusty winds, inextensible members are more desirable in order to limit the range of horizontal movement. There will be very little vertical displacement in either case, since there should be no vertical wind force to excite such movement.

BRIEF DESCRIPTION OF THE DRAWINGS

The accompanying drawings are incorporated into and form a part of the specification to assist in explaining the present inventions. The drawings illustrate preferred and alternative examples of how the inventions can be made and used and are not to be construed as limiting the inventions to only those examples illustrated and described. The various advantages and features of the present inventions will be apparent from a consideration of the drawings in which:

FIG. 1 shows a first preferred embodiment of the hunter decoy of the present inventions as it appears when installed in a typical hunting blind; and FIG. 2 shows a cross-section view of the hunting blind as taken along plane 2—2 of FIG. 1 so as to show installation details of one embodiment of the present invention.

FIG. 3 shows a cross-sectional view of the elongate plug of the preferred embodiments of FIGS. 2, 4 and 7–13;

FIG. 11 shows mounting the hunter decoy as shown in FIG. 2 with an additional single, continuous horizontal elastic member spanning both sides;

FIG. 12 shows mounting the hunter decoy as shown in FIG. 2 with the addition of two opposed horizontal elastic members;

DETAILED DESCRIPTION OF THE DRAWINGS

Figure 4:
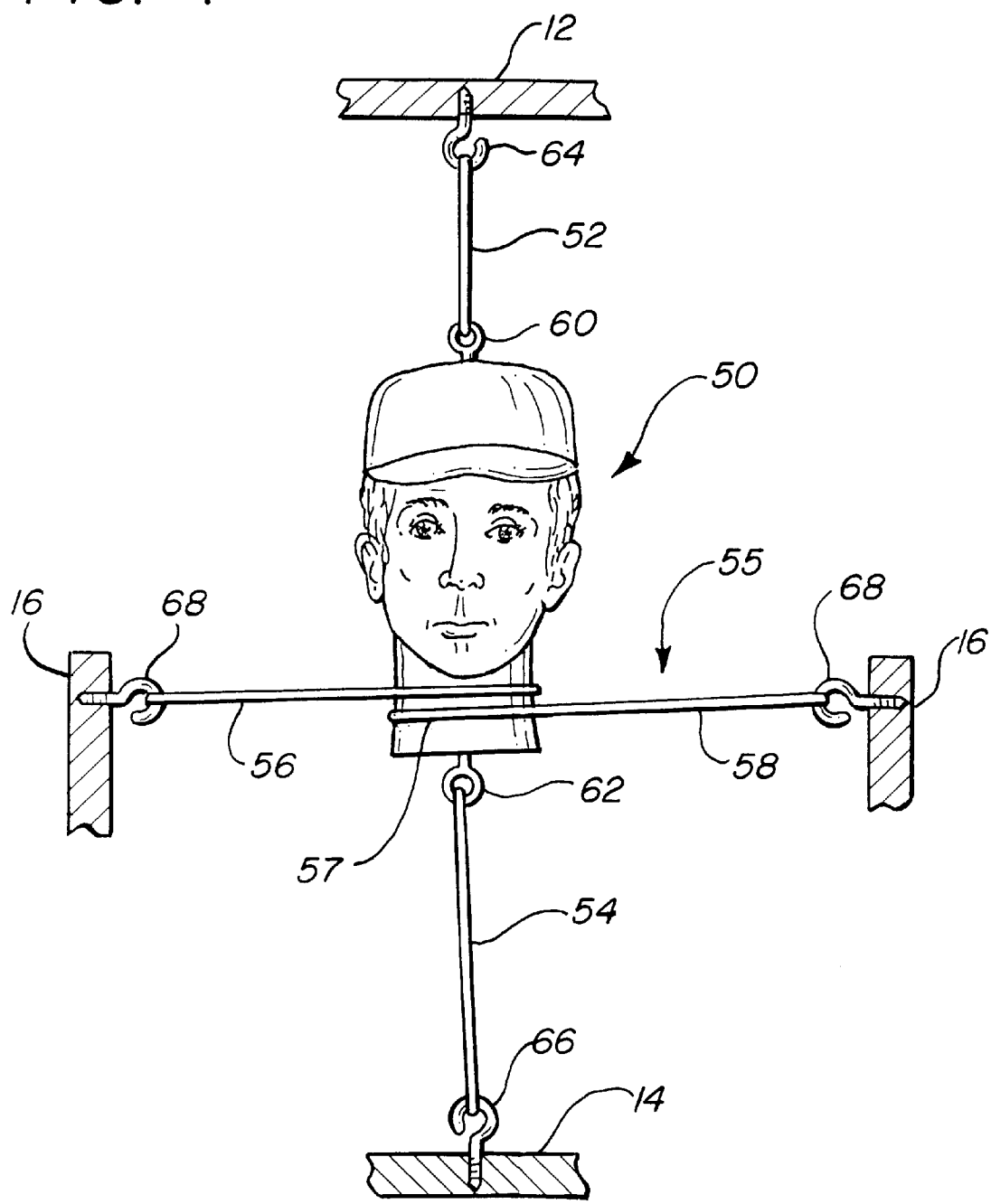
FIG. 4 shows the installation details of a preferred embodiment of the present invention using upper and lower extensible strand vertical support members, with an additional single, continuous horizontal elastic member spanning both sides.

The embodiments shown above and described herein are exemplary. Many details are well known in the art, and as such are neither shown nor described. It is not claimed that all of the details, parts, elements, or steps described and shown were invented herein. Even though numerous characteristics and advantages of the present inventions have been described in the drawings and accompanying text, the description is illustrative only. Changes may be made in the details, especially in matters of shape, size, and arrangement of the parts, within the principles of the inventions, to the full extent indicated by the broad general meaning of the terms used in the attached claims.

FIGS. 1–3 are illustrative of forms expressing preferred embodiments of the present inventions. Hunter decoy assembly 20, as shown in FIG. 1, is installed in blind 10 using upper and lower vertical inextensible strand members 34 and 36, as connected to roof 12 and floor 14 respectfully. Since hunting blinds are intended to provide good visibility of the surrounding area, hunter decoy 20 is readily seen from outside of hunting blind 10 through openings 15 on all sides thereof. The mounting of hunter decoy 20 is arranged to allow its movement under the influence of the wind, adding credibility to the simulation of human occupancy. In time, animals become accustomed to the presence of hunter decoy 20 in the blind and its movement, so as to be less wary when an actual hunter occupies blind 10. Hunter decoy 20 comprises an elongate plug 22 made of a light weight, closed cell, foam material such as styrofoam, but may be made of any similar, inexpensive material. The low mass of foam type materials allows movement even in light to moderate breezes. Inasmuch as some form of structural reinforcement is deemed desirable for attachment of upper and lower strand members 34 and 36, longitudinal core member 24 is inserted along longitudinal axis 25 of elongate plug 22 where it is adhesively retained. Connecting eyes 38 and 40 are screwed into longitudinal core member 24 (ref. FIG. 3) for the connection of vertical inextensible support strand members 34 and 36. Vertical strand members 34 and 36 are attached in turn to attaching hook 42 in blind roof 12 and attaching hook 44 in blind floor 14.

FIG. 2 is a section view taken along cutting plane 2—2 of FIG. 1, wherein the life-like appearance of hunter decoy assembly 20 may be cosmetically enhanced by skin coloration and hair 29. Aerodynamic accessories, such as cap 26 and possibly pipe 28, shift the lateral center of aerodynamic pressure 32 of hunter decoy 20 forward to create a "weather vane" moment arm about longitudinal axis 25. Elongate plug 22, with nose extension 30 is also shaped to shift lateral center of aerodynamic pressure 32 forward and longitudinal axis 25 can be positioned rearwardly to augment the effective moment arm length. Even so, if it is deemed more desirable to arrange hunter decoy 20 so that nose 30 pivots into the wind rather than away, clear plastic vane 31 can be extended to the rear of elongate plug 22 and longitudinal axis 25 may also be relocated in a more forward position so that lateral center of aerodynamic pressure 33 is behind longitudinal axis 25. As hunter decoy 20 pivots to the right or left, torsional resistance increases in upper and lower vertical inextensible strand members 34 and 36, which are secured to roof 12 and floor 14 of hunting blind 10 by attaching hooks 42 and 44 respectively. This torsional resistance serves to limit the range of pivotal movement and provide self centering action. The tightness of upper and lower vertical strand members 34 and 36 limits the range of lateral movement allowed for hunter decoy 20.

FIG. 3 is a cross-sectional view of the elongate plug 22 of FIG. 2, showing the inclusion of adhesively bonded vertical structural member 24 along longitudinal axis 25 for attachment of upper connecting eye 38 and lower connecting eye 40. Lateral structural member 46 may be installed to support lateral attachment eyes 48 in a similar manner if lateral stabilization or additional torsional restraint is deemed necessary, as shown in FIGS. 7–10, 12 and 13.

FIG. 4 shows a preferred mounting for hunter decoy 50, using upper and lower vertical extensible support strand members 52 and 54 respectively, in conjunction with a continuous elastic member 55 passing loop 57 around the neck portion of hunter decoy 50 to provide right and left horizontal elastic member portions 56 and 58 respectively. Vertical members 52 and 54 are attached to hunter decoy 50 by connecting eyes 60 and 62 respectively, and are secured to the hunting blind roof 12 and floor 14 by attaching hooks 64 and 66 respectively. Right and left horizontal elastic member portions 56 and 58, are secured to side walls 16 of blind 10 by attaching hooks 68 so as to act as centering springs. Connecting eyes 60 and 62 are installed in hunter decoy 50 in the same manner as attachment eyes 38 and 40 are shown to be installed in FIG. 3.

As is typical of all the disclosed embodiments, hunter decoy 50 may be cosmetically enhanced, and the lateral center of aerodynamic pressure is shifted forward to create a wind pressure turning moment about the longitudinal axis; the longitudinal axis being defined by upper and lower vertical extensible strand members 52 and 54. As hunter decoy 50 pivots right or left from its center position, torsional resistance increases slightly in upper and lower vertical members 52 and 54, while at the same time, tension in these members urges hunter decoy 50 to an axially centered, side-to-side position. Tension in one of the side connected horizontal elastic member portions 56 and 58 increases, while tension in the opposite horizontal member decreases as hunter decoy 50 pivots, depending upon pivotal direction. This tension differential, combined with the torsional resistance serves to limit the range of pivotal movement of hunter decoy 50 and provides self centering to the pivotal action. Portions of loop 57 drag against each other and the neck of hunter decoy 50 during pivotal movement and the resulting frictional losses provide useful damping to the self-centering action. Lateral deflection of hunter decoy 50 is limited by the preload tension forces exerted by vertical extensible strand members 52 and 54 and the preload tension forces exerted by horizontal extensible elastic member portions 56 and 58.

Figure 5:
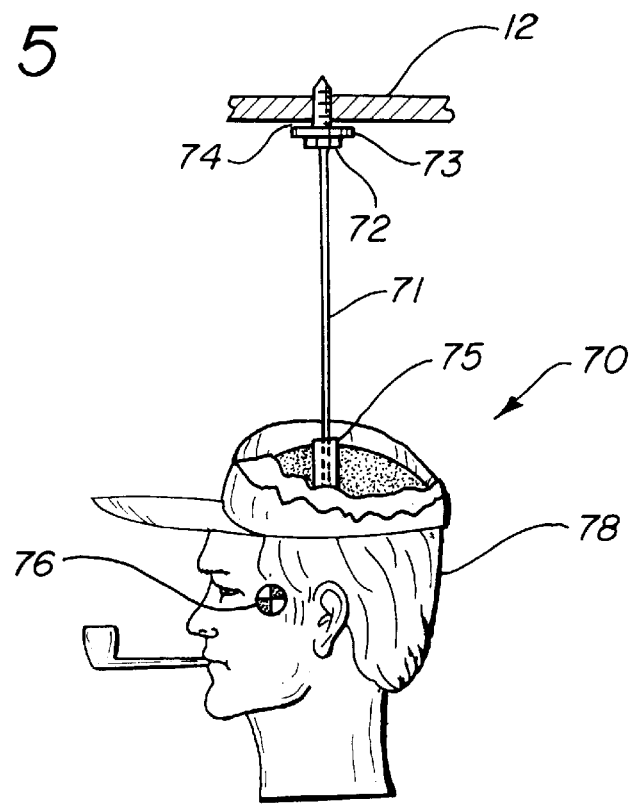
FIG. 5 shows a single vertical rod member mounting of the hunter decoy.

FIG. 5 shows a single vertical rod member 71 for attaching hunter decoy 70 to hunting blind roof 12. Lag screw 72 extends through bent loop 74 at the upper end of rod member 71 to engage roof 12. Washer 73 locks bent loop 74 against roof 12 so that rod member 71 is held securely in place. The lower end of rod member 71 extends into longitudinal core member 75, where it is securely held by an adhesive bond or threaded connection and longitudinal core member 75 is adhesively bonded into elongate plug member 78. As is previously described for the embodiment of FIG. 2, the lateral center of aerodynamic pressure 76 is displaced from the vertical centerline of rotation, as defined by vertical rod member 71, so that wind pressure will result in a side-to-side pivotal movement of hunter decoy 70. Rod member 71 acts as a torsional spring, providing resistance to the pivotal movement and self centering action. A limited range of omni-directional lateral movement is also allowed by the horizontal flexing of rod member 71.

Figure 6:
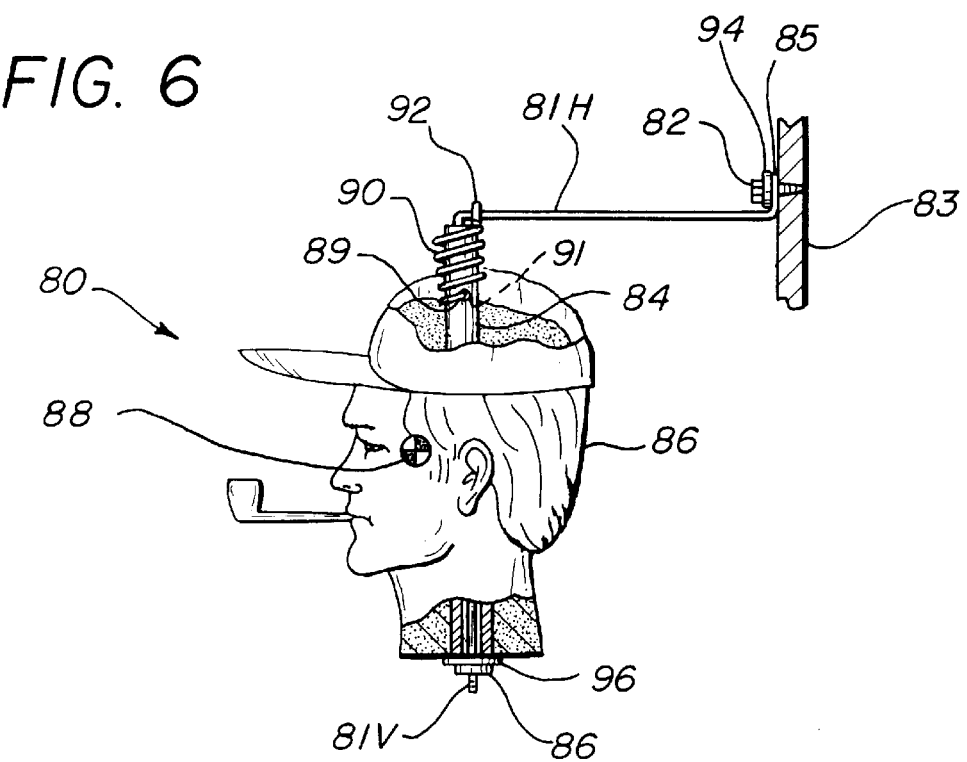
FIG. 6 shows a single horizontal rod member mounting of the hunter decoy.

FIG. 6 shows a single rod member, designated as 81H and 81V, for attaching hunter decoy 80, to a hunting blind in an alternative manner. Lag screw 82 extends through bent loop 85 at the outer end of rod member portion 81H to engage wall or corner member 83 of hunting blind 10. Washer 94 locks bent loop 85 against wall or corner member 83 so that rod member 81H/81V is held securely in place. The other end of rod member portion 81H is bent down at a right angle to form rod member portion 81V, which extends through an oversized axial hole through the length of longitudinal core member 84, where it is held by thrust washer 96 and retaining lock nut 86. Round longitudinal core member 84 is adhesively bonded into elongate plug 86. Lateral center of aerodynamic pressure 88 is displaced from the vertical centerline of rotation, as defined by downwardly bent rod member portion 81V, so that wind pressure will result in a side-to-side pivotal movement of hunter decoy 80. Coil spring 90, wrapped loosely around the upper end of round longitudinal core member 84, includes a tang portion 91 that is inserted into a selected hole of circumferential hole series 89 so as to adjust the angular relationship of hunter decoy 80 with respect to rod member 81H. Bent loop 92 at the upper end of coil spring 90 engages rod member 81H so that coil spring 90 provides torsional resistance and self centering action to the pivotal movement of hunter decoy 80. Hunter decoy 80 is not free for lateral movement except that allowed by horizontal or torsional flexing of rod member 81H.

Figure 7:
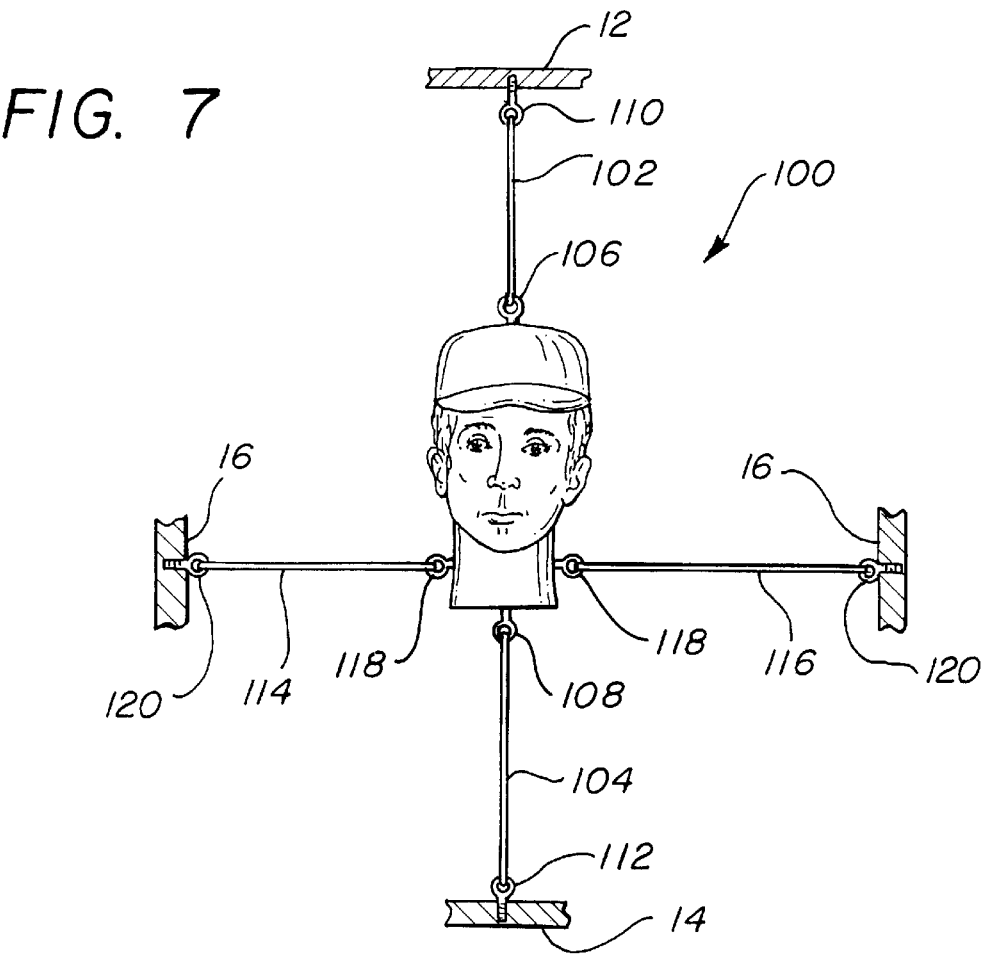
FIG. 7 shows mounting the hunter decoy with four elastic support members

FIG. 7 shows an alternative mounting for hunter decoy 100, using upper and lower vertical extensible, elastic strand support members 102 and 104 respectively, in conjunction with right and left elastic members 114 and 116. Vertical members 102 and 104 are attached to hunter decoy 100 by connecting eyes 106 and 108, and are secured to blind roof 12 and floor 14 by attaching hooks 110 and 112 respectively. Right and left horizontal elastic members 114 and 116 respectively, are attached to hunter decoy 100 by connecting eyes 118 and are secured to side walls 16 of blind 10 by attaching hooks 120. Connecting eyes 106, 108 and 118 are installed in hunter decoy 100 in the same manner as attachment eyes 38, 40 and 48 are shown to be installed in FIG. 3.

As is typical of all the disclosed embodiments, the hunter decoy is cosmetically enhanced, and the lateral center of aerodynamic pressure is shifted forward to create a wind pressure turning moment about the longitudinal axis; the longitudinal axis being defined by vertical support members 102 and 104. As hunter decoy 100 pivots right or left from its center position, torsional resistance increases in upper and lower elastic strand members 102 and 104, while at the same time and the tension in both of the side connected elastic members 114 and 116 also increases. These tension forces, combined with the torsional resistance, serve to limit the range of pivotal movement of hunter decoy 100 and provides self centering action. The tension forces exerted by elastic members 102, 104, 114 and 116 limit the range of lateral displacement allowed for hunter decoy 100.

Figure 8:
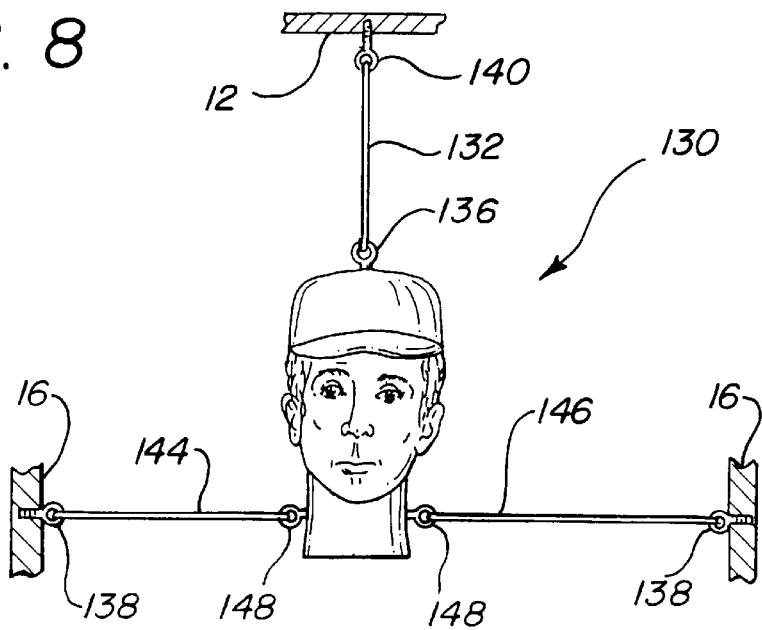
FIG. 8 shows mounting the hunter decoy with one vertical support member and two opposed horizontal elastic members.

FIG. 8 shows an alternative mounting for hunter decoy 130, with one extensible elastic or inextensible wire vertical support member 132 and two opposed horizontal elastic members 144 and 146. Vertical member 132 is attached to hunter decoy 130 by connecting eye 136, and is secured to blind roof 12 by attaching hook 140. Right and left horizontal elastic members 144 and 146 respectively, are attached to hunter decoy 130 by connecting eyes 148 and are secured to side walls 16 of blind 10 by attaching hooks 138. Connecting eyes 136 and 148 are installed in hunter decoy 130 in the same manner as attachment eyes 38 and 48 are shown to be installed in FIG. 3.

As is typical of all the disclosed embodiments, hunter decoy 130 is cosmetically enhanced, and the lateral center of aerodynamic pressure is shifted forward to create a wind pressure turning moment about the longitudinal axis; the longitudinal axis being defined by vertical support member 132. As hunter decoy 130 pivots right or left from its center position, torsional resistance increases in vertical support member 132, while at the same time, tension in both of the side connected elastic members 144 and 146 also increases. This tension, combined with the torsional resistance, serves to limit the range of pivotal movement of hunter decoy 130 and provides self centering action. The tension forces exerted by elastic members 144 and 146 also limit the range of lateral movement allowed for hunter decoy 130.

Figure 9:
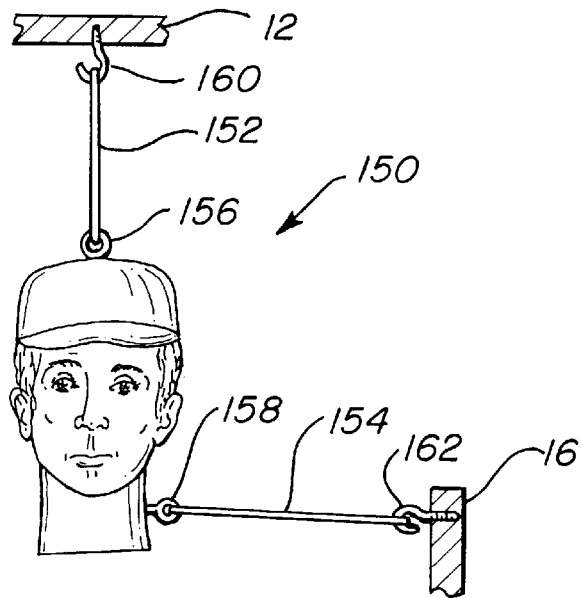
FIG. 9 shows mounting the hunter decoy with one vertical support member and a single, inextensible member on one side.

FIG. 9 shows a mounting for hunter decoy 150, with one inextensible vertical support strand member 152 and a single inextensible horizontal strand member 154, attached to side wall 16 of blind 10. This mounting is undesirable because it does not limit horizontal displacement of hunter decoy 150 sufficiently in two orthogonal directions, resulting in unwanted violent movement in a strong wind. Vertical member 152 is attached to hunter decoy 150 by connecting eye 156 and is secured to blind roof 12 by attaching hook 160. Horizontal strand member 154 is attached to hunter decoy 150 by connecting eye 158 and is secured to side wall 16 of blind 10 by attaching hook 162. Connecting eyes 156 and 158 are installed in hunter decoy 150 in the same manner as connecting eyes 38 and 48 are shown to be installed in FIG. 3.

As is typical of all the disclosed embodiments, hunter decoy 150 is cosmetically enhanced, and the lateral center of aerodynamic pressure is shifted forward to create a wind pressure turning moment about the longitudinal axis; the longitudinal axis being defined by vertical support member 152. As hunter decoy 150 pivots right or left from its center position, a degree of torsional resistance is created in vertical inextensible support strand member 152 and, at the same time, the center of mass of hunter decoy 150 is pulled away from vertical alignment with attaching hook 160 by the side connected horizontal inextensible strand member 154. The torsional resistance in vertical inextensible support strand member 152, together with the force of gravity acting on hunter decoy 150, tends to limit the range of pivotal movement allowed and provide self centering action. Otherwise, hunter decoy 150 is free to swing back and forth along an relatively unchecked arcuate path determined by the lengths of inextensible strand members 152 and 154.

Figure 10:
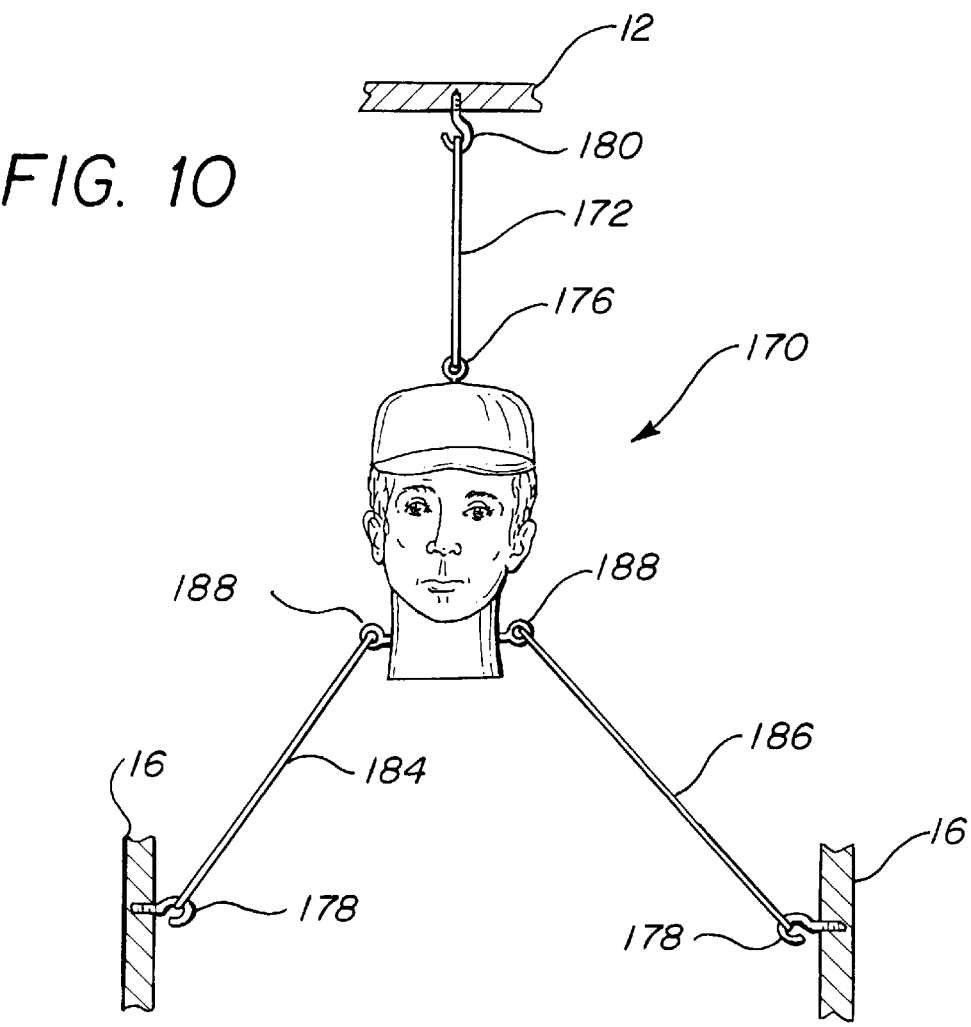
FIG. 10 shows mounting the hunter decoy with one vertical support member and two opposed inclined elastic members.

FIG. 10 shows another alternative mounting for hunter decoy 170, with one vertical support strand member 172, which may be either extensible elastic or inextensible wire, and two opposed inclined extensible members 184 and 186. Vertical strand member 172 is attached to hunter decoy 170 by connecting eye 176, and is secured to blind roof 12 by attaching hook 180. Right and left inclined elastic strand members 184 and 186 respectively, are attached to hunter decoy 170 by connecting eyes 188 and are secured to side walls 16 of blind 10 by attaching hooks 178. Connecting eyes 176 and 188 are installed in hunter decoy 170 in the same manner as attachment eyes 38 and 48 are shown to be installed in FIG. 3.

As is typical of all the disclosed embodiments, hunter decoy 170 is cosmetically enhanced, and the lateral center of aerodynamic pressure is shifted forward to create a wind pressure turning moment about the longitudinal axis; the longitudinal axis being defined by vertical support strand member 172. As hunter decoy 170 pivots right or left from its center position, torsional resistance increases in vertical support member 172, while at the same time, tension in the side connected elastic members 184 and 186 also increases. This combined resistance serves to limit the range of pivotal movement of hunter decoy 170 and provides self centering action. The tension forces exerted by elastic members 184 and 186 also serve to limit the range of lateral movement allowed for hunter decoy 170.

FIG. 11 shows an alternative mounting for hunter decoy 190, using upper and lower vertical inextensible support strand members 192 and 194 respectively, in conjunction with a continuous elastic member 195 passing loop 197 around the neck portion of hunter decoy 190 to provide right and left horizontal elastic member portions 196 and 198. Vertical members 192 and 194 are attached to hunter decoy 190 by connecting eyes 200 and 202 respectively, and are secured to the hunting blind roof 12 and floor 14 by attaching hooks 204 and 206 respectively. Right and left horizontal elastic member portions 196 and 198, are secured to side walls 16 of blind 10 by attaching hooks 208. Connecting eyes 200 and 202 are installed in hunter decoy 190 in the same manner as attachment eyes 38 and 40 are shown to be installed in FIG. 3.

As is typical of all the disclosed embodiments, hunter decoy 190 is cosmetically enhanced, and the lateral center of aerodynamic pressure is shifted forward to create a wind pressure turning moment about the longitudinal axis; the longitudinal axis being defined by vertical support members 192 and 194. As hunter decoy 190 pivots right or left from its center position, torsional resistance increases in upper and lower inextensible vertical strand members 192 and 194. Since these vertical members permit very little side-to-side movement of hunter decoy 190, tension in one of the side connected horizontal elastic member portions 196 or 198 increases as hunter decoy 190 pivots either right or left, while tension in the opposite member portion decreases. This tension differential, combined with the torsional resistance, serves to limit the range of pivotal movement of hunter decoy 190 and provides self centering action. Portions of loop 197 drag against each other and the neck of hunter decoy 190 during pivotal movement and the resulting frictional losses provide useful damping to the self-centering action. Lateral deflection of hunter decoy 190 is limited by the tightness of vertical inextensible strand members 192 and 194 and the preload tension forces exerted by horizontal extensible elastic member portions 196 and 198.

FIG. 12 shows an alternative mounting for hunter decoy 210, using upper and lower vertical inextensible support strand members 212 and 214 respectively, in conjunction with right and left horizontal extensible strand members 216 and 218. Vertical members 212 and 214 are attached to hunter decoy 210 by connecting eyes 220 and 222, and are secured to blind roof 12 and floor 14 by attaching hooks 224 and 226 respectively. Right and left horizontal elastic members 216 and 218, are attached to hunter decoy 210 by connecting eyes 228 and are secured to side walls 16 of blind 10 by attaching hooks 230. Connecting eyes 220, 222 and 228 are installed in hunter decoy 210 in the same manner as attachment eyes 38, 40 and 48 are shown to be installed in FIG. 3.

As is typical of all the disclosed embodiments, hunter decoy 210 is cosmetically enhanced, and the lateral center of aerodynamic pressure is shifted forward to create a wind pressure turning moment about the longitudinal axis; the longitudinal axis being defined by the vertical support members 212 and 214. As hunter decoy 210 pivots right or left from its center position, torsional resistance increases in upper and lower inextensible strand support members 212 and 214, while at the same time and the tension in both side connected elastic members 216 and 218 also increases. This tension, combined with the torsional resistance, serves to limit the range of pivotal movement of hunter decoy 210 and provides self centering action. The tightness of upper and lower vertical inextensible support strand members 212 and 214 and the tension forces exerted by horizontal elastic members 216 and 218 limit the range of omnidirectional lateral movement allowed for hunter decoy 210.

Figure 13:
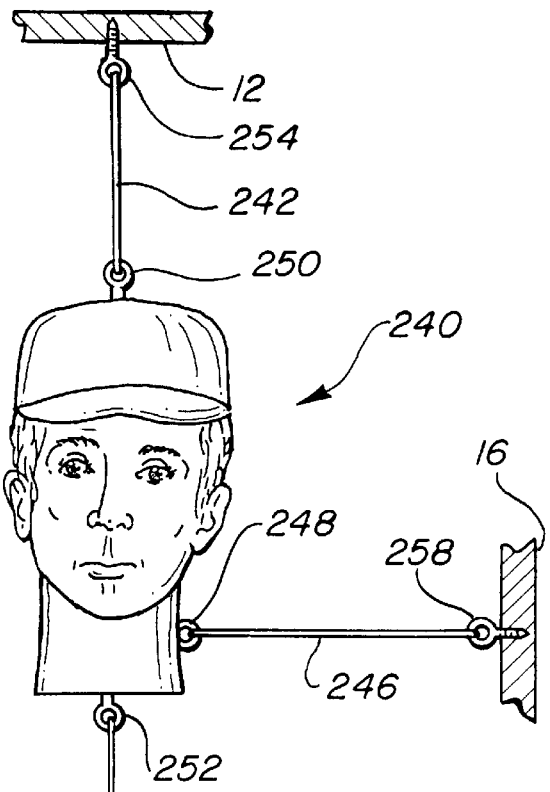
FIG. 13 shows mounting the hunter decoy as shown in FIG. 2 with the addition of a single horizontal elastic member at one side.

FIG. 13 shows an alternative mounting for hunter decoy 240, using upper and lower vertical inextensible support strand members 242 and 244 respectively, in conjunction with a single horizontal extensible member 246. Vertical members 242 and 244 are attached to hunter decoy 240 by connecting eyes 250 and 252, and are secured to blind roof 12 and floor 14 by attaching hooks 254 and 256 respectively. Horizontal elastic member 246 is attached to hunter decoy 240 by connecting eye 248 and secured to side wall 16 of blind 10 by attaching hook 258. Connecting eyes 250, 252 and 248 are installed in hunter decoy 240 in the same manner as attachment eyes 38, 40 and 48 are shown to be installed in FIG. 3.

As is typical of all the disclosed embodiments, hunter decoy 240 is cosmetically enhanced, and the lateral center of aerodynamic pressure is shifted forward to create a wind pressure turning moment about the longitudinal axis; the longitudinal axis being defined by the vertical support members 242 and 244. As hunter decoy 240 pivots right or left from its center position, torsional resistance increases in upper and lower inextensible support strand members 242 and 244, while at the same time and the tension in the side connected elastic member 246 also increases. This tension, combined with the torsional resistance, serves to limit the range of pivotal movement of hunter decoy 240 and provide self centering action. The tightness of upper and lower vertical inextensible support strand members 242 and 244 limits the range of omnidirectional lateral movement allowed for hunter decoy 240.

Figure 14:
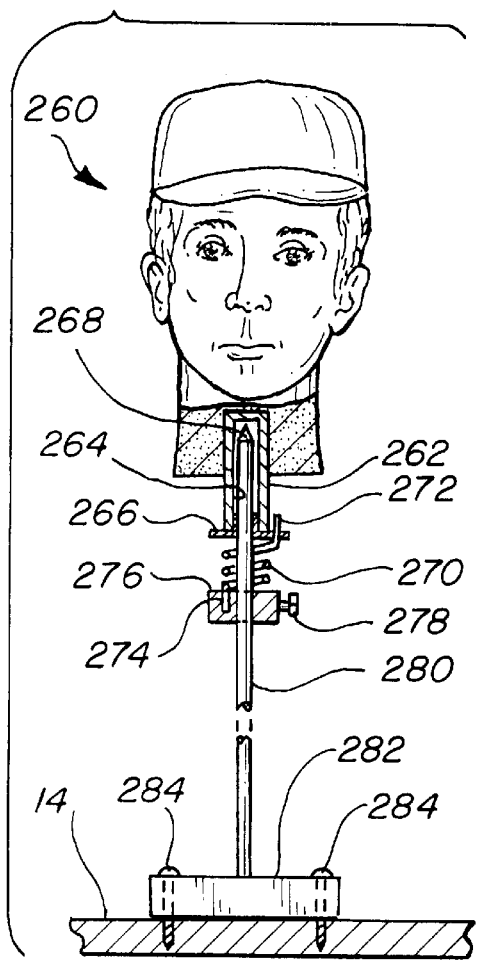
FIG. 14 shows an alternative single vertical support member mounting of the hunter decoy.

FIG. 14 shows an alternative single vertical mast member 280 supporting hunter decoy 260. The mast point 268 extends into blind center hole 264 in longitudinal core member 262 and serves as a thrust bearing against the flat end of blind center hole 264. Longitudinal core member 262 is installed in hunter decoy 260 in the same manner as longitudinal core member 24 is shown to be installed in FIG. 3. Coil spring 270 acts in torsion, in either a clockwise or counterclockwise direction, to provide an elastic self-centering means for pivotal movement of hunter decoy 260. Flanged thin wall bushing insert 266 is pressed into the open end of blind center hole 264, where a drilled hole in its flange receives upwardly facing bent tang 272 of coil spring 270. Downwardly facing bent tang 274 is similarly received by a drilled hole in collar 276, which is clamped to mast 280 by set screw 278. Mast 280 is supported in its vertical position by pedestal 282, attached to floor 14 of blind 10 by screws 284 or any other suitable fastener means.

As is typical of all the disclosed embodiments, hunter decoy 240 may be cosmetically enhanced, and the lateral center of aerodynamic pressure is shifted forward to create a wind pressure turning moment about the longitudinal axis; the longitudinal axis being defined by vertical mast 280. As hunter decoy 260 pivots right or left from its center position, torsional resistance increases in coil spring 270, serving to limit the range of pivotal movement of hunter decoy 260 and providing self centering action to the pivotal movement. The amount of pivotal deflection to either side depends upon the torsional spring rate of coil spring 270. The stiffness of mast 280, limits the range of omni-directional lateral movement that is allowed for hunter decoy 240.

The restrictive description and drawings of the specific examples above do not point out what an infringement of this patent would be, but are to provide at least one explanation of how to use and make the inventions. The limits of the inventions and the bounds of the patent protection are measured by and defined in the following claims.

I claim:

1. Apparatus for conditioning game to human presence and movement in a hunting blind comprising:

a hunting blind;

an elongate plug member of lightweight material, shaped to resemble a human head at the upper end, with a neck at the lower end, said plug member having a lateral center of aerodynamic pressure and a vertically oriented longitudinal axis horizontally displaced therefrom;

a vertical support member supporting said elongate plug member in said hunting blind, the vertical support member being attached at said longitudinal axis, so as to permit pivotal movement of said elongate plug thereabout; and means for limiting horizontal displacement of said elongate plug.

2. Apparatus for conditioning game to human presence and movement in a hunting blind according to claim 1, wherein said vertical support member is substantially inextensible, and further comprising a structural reinforcement connecting said elongate plug to said vertical support member, proximate said longitudinal axis.

3. Apparatus for conditioning game to human presence and movement in a hunting blind according to claim 1, wherein said vertical support member is significantly extensible, and further comprising a structural reinforcement connecting said elongate plug to said vertical support member, proximate said longitudinal axis.

4. Apparatus for conditioning game to human presence and movement in a hunting blind according to claim 1, wherein the shape of said elongate plug member and the location of said longitudinal axis position the lateral center of aerodynamic pressure at a point horizontally displaced from said longitudinal axis.

5. Apparatus for conditioning game to human presence and movement in a hunting blind according to claim 1, wherein at least one aerodynamic accessory to said elongate plug positions the lateral center of aerodynamic pressure at a point horizontally displaced from said longitudinal axis.

6. Apparatus for conditioning game to human presence and movement in a hunting blind according to claim 1 and further comprising means for centering the pivotal movement of said elongate plug member.

7. Apparatus for conditioning game to human presence and movement in a hunting blind comprising:

a hunting blind;

an elongate plug member of lightweight material, shaped to resemble a human head at the upper end with a neck at the lower end, said elongate plug member having a lateral center of aerodynamic pressure and a vertically oriented longitudinal axis horizontally displaced therefrom;

a structural reinforcement providing a connection to said elongate plug member at said longitudinal axis; and a vertical support member attached to said connection and supporting said elongate plug in said hunting blind so as to permit pivotal movement thereof about said longitudinal axis while limiting horizontal displacement of said elongate plug in at least two orthogonal directions; and means for centering the pivotal movement of said elongate plug member.

8. Apparatus for conditioning game to human presence and movement in a hunting blind according to claim 7 wherein said means for centering is at least one extensible strand member.

9. Apparatus for conditioning game to human presence and movement in a hunting blind according to claim 7 wherein said vertical member is substantially inextensible.

10. Apparatus for conditioning game to human presence and movement in a hunting blind according to claim 7 wherein said means for centering comprises first and second elastic members connected to said elongate plug so as to impose equal and opposite horizontal vector forces thereon at the centered position.

11. Apparatus for conditioning game to human presence and movement in a hunting blind according to claim 7 wherein said means for centering comprises horizontally opposed first and second elastic members.

12. Apparatus for conditioning game to human presence and movement in a hunting blind according to claim 7 wherein the shape of said elongate plug and the location of said longitudinal axis position the lateral center of aerodynamic pressure at a point horizontally displaced from said longitudinal axis.

13. Apparatus for conditioning game to human presence and movement in a hunting blind according to claim 7 wherein at least one aerodynamic accessory added to said elongate plug positions the lateral center of aerodynamic pressure at a point horizontally displaced from said longitudinal axis.

14. Apparatus for conditioning game to human presence and movement in a hunting blind comprising:

an elongate plug of lightweight material having an upper and a lower end, with a substantially central longitudinal axis, the exterior of said plug being shaped to resemble a human head at the upper end with a neck portion at the lower end;

a first structural connection at said upper end and a second structural connection at said lower end, the connections being proximate said longitudinal axis;

first and second vertical support strand members attached to said upper and lower structural connections and supporting said elongate plug with the longitudinal axis thereof in a generally vertical orientation so as to permit pivotal movement of said elongate plug about said longitudinal axis and limit horizontal displacement of said elongate plug in at least two orthogonal directions; and third and fourth elastic strand members connected to said elongate plug to center pivotal movement thereof.

15. Apparatus for conditioning game to human presence and movement in a hunting blind according to claim 14 wherein said third and forth elastic members act on said elongate plug at a point displaced from said longitudinal axis so as to impose a counteracting force whenever said elongate plug is subjected to pivotal movement.

16. Apparatus for conditioning game to human presence and movement in a hunting blind according to claim 14 wherein said elastic member encircles said elongate plug and extends therefrom in opposed directions.

17. Apparatus for conditioning game to human presence and movement in a hunting blind according to claim 14 wherein the shape of said elongate plug and the location of said longitudinal axis position the lateral center of aerodynamic pressure at a point horizontally displaced from said longitudinal axis.

18. Apparatus for conditioning game to human presence and movement in a hunting blind according to claim 14 wherein at least one aerodynamic accessory to said elongate plug axis positions the lateral center of aerodynamic pressure at a point horizontally displaced from said longitudinal axis.

19. Apparatus for conditioning game to human presence and movement in a hunting blind according to claim 14 wherein said vertical support strand members are substantially inextensible.

20. Apparatus for conditioning game to human presence and movement in a hunting blind according to claim 14 wherein said vertical support strand members are significantly extensible.

21. A method for conditioning game to human presence and movement in a hunting blind comprising the steps of:

providing a hunting blind;

providing an elongate plug shaped to resemble a human head;

pivotally mounting the elongate plug so as to be visible in the hunting blind and exposed to ambient winds;

allowing the elongate plug to pivot in the wind about a vertical axis so as to create the appearance of human movement; and limiting horizontal displacement of the elongate plug due to the wind.

* * * * *